United States Patent
Kim (10) Patent No.: US 10,839,187 B2
(45) Date of Patent: Nov. 17, 2020

(54) SENSING UNIT HAVING IMPROVED RELIABILITY OF TOUCH DATA BY SENSING COMPENSATION PART AND DISPLAY DEVICE INCLUDING THE SAME

(71) Applicant: Samsung Display Co., Ltd., Yongin-Si (KR)

(72) Inventor: Yun-Ho Kim, Hwaseong-Si (KR)

(73) Assignee: Samsung Display Co., Ltd., Yongin-si (KR)

( * ) Notice: Subject to any disclaimer, the term of this patent is extended or adjusted under 35 U.S.C. 154(b) by 8 days.

(21) Appl. No.: 16/151,247

(22) Filed: Oct. 3, 2018

(65) Prior Publication Data
US 2019/0114455 A1   Apr. 18, 2019

(30) Foreign Application Priority Data
Oct. 17, 2017   (KR) .................... 10-2017-0134802

(51) Int. Cl.
| *G06K 9/00* | (2006.01) |
|---|---|
| *G06F 3/044* | (2006.01) |
| *G06F 3/041* | (2006.01) |
| *G06F 21/32* | (2013.01) |

(52) U.S. Cl.
CPC .......... *G06K 9/0002* (2013.01); *G06F 3/044* (2013.01); *G06F 3/0416* (2013.01); *G06F 3/0443* (2019.05); *G06F 3/0446* (2019.05); *G06F 21/32* (2013.01); *G06F 2203/04111* (2013.01); *G06F 2203/04112* (2013.01)

(58) Field of Classification Search
CPC ...... G06F 21/32; G06F 3/0416; G06F 3/0443; G06F 3/044; G06F 3/0446; G06F 2203/04111; G06F 2203/04112; G06K 9/0002
See application file for complete search history.

(56) References Cited

U.S. PATENT DOCUMENTS

| 2013/0135247 | A1* | 5/2013 | Na ........................ G06F 21/32 |
|---|---|---|---|
| | | | 345/174 |
| 2015/0227233 | A1* | 8/2015 | Yi ........................ G06F 3/044 |
| | | | 345/174 |
| 2016/0202779 | A1 | 7/2016 | Jiang et al. |
| 2016/0224818 | A1 | 8/2016 | Song et al. |
| 2016/0364593 | A1* | 12/2016 | Lee ...................... G06F 3/0416 |
| 2017/0024602 | A1* | 1/2017 | Han ...................... G06F 3/0416 |

(Continued)

FOREIGN PATENT DOCUMENTS

| KR | 10-1432988 B1 | 8/2014 |
|---|---|---|
| KR | 10-2016-0096257 A | 8/2016 |

(Continued)

*Primary Examiner* — Kwang-Su Yang
(74) *Attorney, Agent, or Firm* — Lewis Roca Rothgerber Christie LLP (57) ABSTRACT

A sensing unit includes a first sensing part including a plurality of sensing electrodes and a plurality of connection electrodes connecting the plurality of sensing electrodes, a second sensing part including a plurality of first electrodes and a plurality of second electrodes crossing the plurality of first electrodes, and a sensing compensation part including a first compensation electrode part crossing the plurality of first electrodes and a second compensation electrode part crossing the plurality of second electrodes.

19 Claims, 8 Drawing Sheets

(56) References Cited

U.S. PATENT DOCUMENTS

2018/0068156 A1 3/2018 Jang et al.
2018/0348949 A1* 12/2018 Kim ..................... G06F 3/0418

FOREIGN PATENT DOCUMENTS

| KR | 10-2016-0098030 A | 8/2016 |
| KR | 10-2017-0010935 A | 2/2017 |
| KR | 10-2018-0026597 A | 3/2018 |
| KR | 10-2018-0077394 A | 7/2018 |

* cited by examiner

SENSING UNIT HAVING IMPROVED RELIABILITY OF TOUCH DATA BY SENSING COMPENSATION PART AND DISPLAY DEVICE INCLUDING THE SAME

CROSS-REFERENCE TO RELATED APPLICATION

This patent application claims priority to and the benefit of Korean Patent Application No. 10-2017-0134802, filed on Oct. 17, 2017, in the Korean Intellectual Property Office, the entire contents of which are hereby incorporated by reference.

BACKGROUND

The present disclosure relates to a sensing unit and a display device including the same.

A sensing unit is configured to sense whether an object (e.g., a finger of a human) is in contact or touch with a screen of a display device. In the sensing unit, a touch event may be detected by various methods (e.g., a resistance-layer method, a photo-sensing method, a capacitance-sensing method, and an ultrasonic wave sensing method). In the capacitance-sensing method, a change in capacitance, which is caused when an object is in touch with the screen of the display device, is used to determine whether a touch event occurs.

Due to recent increase in security-related issues, the security of personal portable devices, such as smart phones and tablet personal computers, has grown more and more important. As a portable device is more frequently used, there is an increasing demand for security technology in the field of electronic commerce via the portable device, and to meet such a demand, technologies using biometric data such as a fingerprint have been suggested.

SUMMARY

Some embodiments of the inventive concept provide a sensing unit and a display device including the same.

According to some embodiments of the inventive concept, a sensing unit may include a first sensing part having a plurality of sensing electrodes and a plurality of connection electrodes connecting the plurality of sensing electrodes, a second sensing part having a plurality of first electrodes and a plurality of second electrodes crossing the plurality of first electrodes, and a sensing compensation part having a first compensation electrode part crossing the plurality of first electrodes and a second compensation electrode part crossing the plurality of second electrodes.

In some embodiments, the plurality of first electrodes may extend in a first direction and may be arranged along a second direction crossing the first direction, and the plurality of second electrodes may extend in the second direction and may be arranged along the first direction.

In some embodiments, the first compensation electrode part may include a plurality of first compensation electrodes. In some embodiments, the plurality of first compensation electrodes extend in the second direction, are arranged in the first direction, and are electrically connected to each other.

In some embodiments, the second compensation electrode part includes a plurality of second compensation electrodes. In some embodiments, the plurality of second compemsation electode part extend in the first direction, are arranged in the second direction, and are electrically connected to each other.

In some embodiments, the plurality of first electrodes and the plurality of second electrodes may be provided on different layers from each other and may be electrically disconnected from each other.

In some embodiments, the plurality of first electrodes and the second compensation electrode part may be on a first same layer, and the plurality of second electrodes and the first compensation electrode part may be on a second same layer.

In some embodiments, the second sensing part and the sensing compensation part may be in a sensing region that has a triangular shape.

In some embodiments, the sensing region may include a fingerprint sensing region, in which the plurality of first electrodes and the plurality of second electrodes cross each other, a first compensation region, in which the plurality of first electrodes and the first compensation electrode part cross each other, and a second compensation region, in which the plurality of second electrodes and the second compensation electrode part cross each other.

In some embodiments, the fingerprint sensing region may have a lozenge shape, and each of the first compensation region and the second compensation region may have a triangular shape.

In some embodiments, the sensing unit may further include a sensing driver, which is configured to receive a first sensing signal from the first sensing part, a second sensing signal from the second sensing part, a first compensation signal from the first compensation region, and a second compensation signal from the second compensation region.

In some embodiments, the sensing driver may be configured to compensate the first sensing signal using the second sensing signal, the first compensation signal, and the second compensation signal.

According to some embodiments of the inventive concept, a sensing unit may include a base layer, in which a touch sensing region, a fingerprint sensing region, and first and second compensation regions. In some embodiments, a plurality of first electrodes are on the fingerprint sensing region and the first compensation region, the plurality of first electrodes extending in a first direction, a plurality of second electrodes are on the fingerprint sensing region and the second compensation region, the plurality of second electrodes extending in a second direction crossing the first direction, a first compensation electrode part is on the first compensation region and crossing the plurality of first electrodes, and a second compensation electrode part is on the second compensation region and crossing the plurality of second electrodes.

In some embodiments, the first compensation electrode part may include a plurality of first compensation electrodes. In various embodiments the plurality of first compensation electrodes extend in the second direction, are arranged in the first direction, and are electrically connected to each other.

In some embodiments, the second compensation electrode part may include a plurality of second compensation electrodes. In various embodimetns, the plurality of second compensation electrodes extend in the first direction, are arranged in the second direction, and are electrically connected to each other.

In some embodiments, the plurality of first electrodes and the plurality of second electrodes may be on different layers from each other and may be electrically disconnected from each other, the plurality of first electrodes and the second compensation electrode part may be on a first same layer, and the plurality of second electrodes and the first compensation electrode part may be provided on a second same layer.

According to some embodiments of the inventive concept, a display device may include a display unit configured to display an image, and a sensing unit on the display unit, the sensing unit including a first sensing part configured to sense a touch event, a second sensing part configured to recognize a fingerprint, and a sensing compensation part configured to produce a first sensing signal for compensating a signal of the first sensing part, using a second sensing signal of the second sensing part.

In some embodiments, the second sensing part may include a plurality of first electrodes and a plurality of second electrodes crossing the plurality of first electrodes, and the sensing compensation part may include a first compensation electrode part crossing the plurality of first electrodes and a second compensation electrode part crossing the plurality of second electrodes.

In some embodiments, the plurality of first electrodes may extend in a first direction and may be arranged in a second direction crossing the first direction. The second compensation electrode part may include a plurality of second compensation electrodes, which extend in the first direction and are arranged in the second direction. The plurality of first electrodes and the plurality of second compensation electrodes may be on a same layer.

In some embodiments, the plurality of second electrodes may extend in the second direction and may be arranged in the first direction. The first compensation electrode part may include a plurality of first compensation electrodes, which extend in the second direction and are arranged in the first direction. The plurality of second electrodes and the plurality of first compensation electrodes may be on a same layer.

In some embodiments, the first compensation electrode part may further include a first compensation connection line connecting the first compensation electrodes to each other, and the second compensation electrode part may further include a second compensation connection line connecting the second compensation electrodes to each other.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION

Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 1:
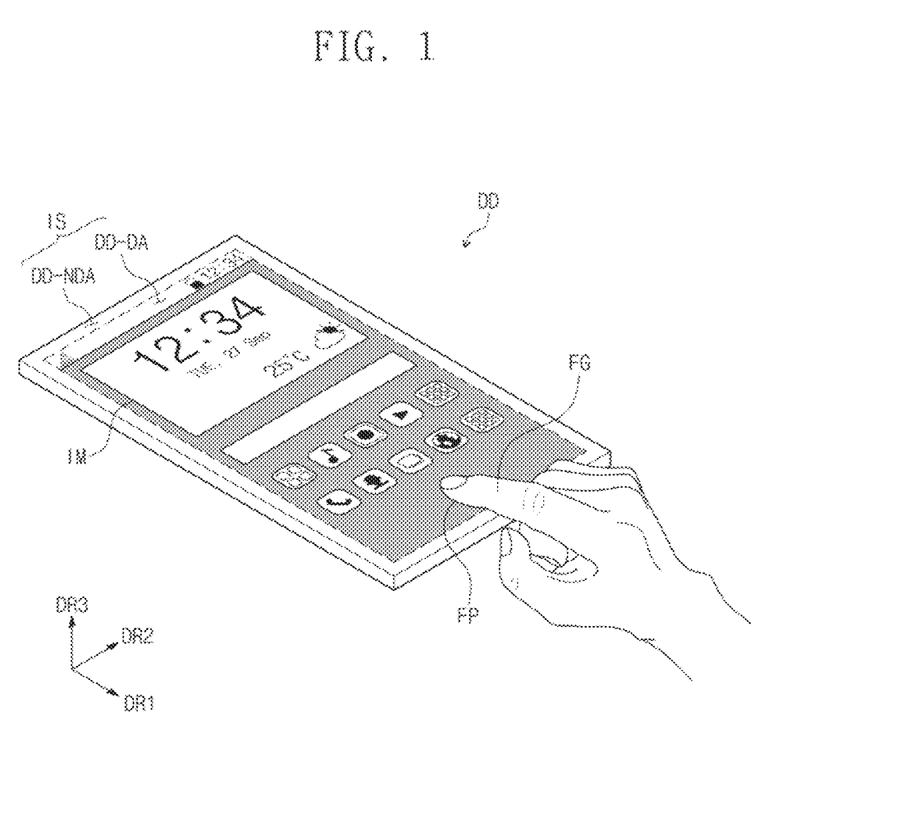
FIG. 1 is a perspective view illustrating a display device according to some embodiments of the inventive concept.

FIG. 1 is a perspective view illustrating a display device according to some embodiments of the inventive concept.

Referring to FIG. 1, a display device DD is configured to display an image IM through a display surface IS. In FIG. 1, the display surface IS is illustrated to have a surface defined by a first direction DR1 and a second direction DR2 crossing the first direction DR1. However, this is just an example of the display surface IS, and in other embodiments, although not shown, a display surface of a display device may have a curved shape.

A direction normal to the display surface IS (or a thickness direction of the display device DD) will be referred to as a third direction DR3. A front or top surface and a rear or bottom surface of each member may be distinguished, based on the third direction DR3. However, directions indicated by the first to third directions DR1, DR2, and DR3 may be relative concepts, and in certain embodiments, they may be changed to indicate other directions. Hereinafter, first to third directions may be directions indicated by the first to third directions DR1, DR2, and DR3, respectively, and will be referenced with the same numerals.

FIG. 1 illustrates an example in which a portable electronic device is used as the display device DD. However, the display device DD may be used for large-sized electronic devices (e.g., television sets, monitors, and outdoor billboards) or small- or medium-sized electronic devices (e.g., personal computers, notebook computers, personal digital assistants, car navigation systems, game machines, smart phones, tablets, and cameras). However, it should be understood that these are merely examples, and that other electronic devices may be used.

The display surface IS may include a display region DD-DA, which is used to display the image IM, and a non-display region DD-NDA, which is provided adjacent to the display region DD-DA. The non-display region DD-NDA may not be used to display an image. As shown in FIG. 1, application icons may be displayed as parts of the image IM. As an example, the display region DD-DA may have a rectangular shape. The non-display region DD-NDA may be provided to enclose the display region DD-DA. However, the inventive concept is not limited thereto, and the shapes of the display and non-display regions DD-DA and DD-NDA may be variously changed in a mutually influential manner.

The display device DD may be configured to recognize a fingerprint FP of a finger FG. In the case where the fingerprint FP of the finger FG is in contact with the display region DD-DA, the fingerprint FP may be recognized using the display device DD. In the display device DD, the recognized fingerprint FP may be used to examine whether the user is authorized. The fingerprint FP may be used for security of a portable device, financial transactions, system control or the like.

Figure 2:
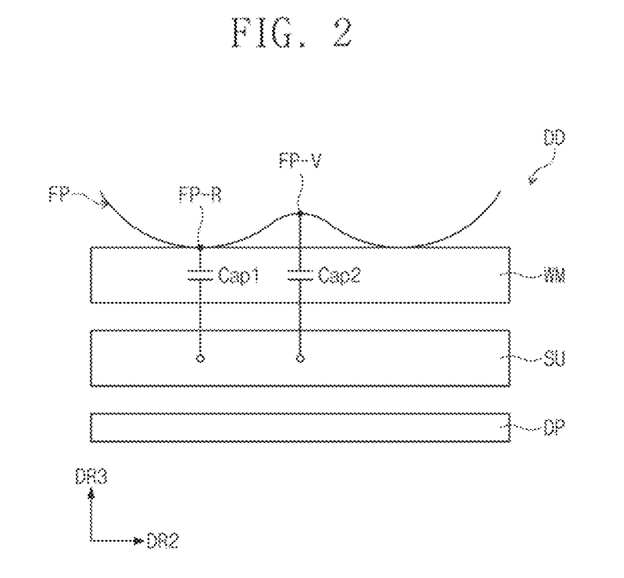
FIG. 2 is a sectional view illustrating a portion of a display device according to some embodiments of the inventive concept.

FIG. 2 is a sectional view illustrating a portion of a display device according to some embodiments of the inventive concept.

The display device DD may include a display panel DP, a window WM, and a sensing unit SU.

The display panel DP may include a plurality of light emitting devices. If image data are input to the display panel DP, an image IM (e.g., see FIG. 1) may be produced, based on the image data. The display panel DP may be called 'a display unit'.

The window WM may be provided on the display panel DP and may be configured to protect modules, which are provided below the same, from an external impact and to provide a sensing surface to a user. The display surface IS of FIG. 1 may be used as the sensing surface for sensing an external input.

The sensing unit SU may be placed below the window WM. The sensing unit SU may be configured to sense an external input. The external input may include various types of external inputs, such as a part of a user's body, a stylus pen, light, heat, or pressure. The external input may further include a non-touching-type event (e.g., a hovering event near the sensing unit SU), in addition to such a touching-type event. Furthermore, the external input may be a user's fingerprint, and a portion of the sensing surface may be used as a fingerprint recognition surface for recognizing the fingerprint FP.

To describe the method of recognizing the fingerprint FP, the fingerprint FP of a finger is exemplarily illustrated. The fingerprint FP may include a ridge FP-R and a valley FP-V. Electric capacitance between the ridge FP-R and the sensing unit SU will be referred to as a first capacitance Cap1, and electric capacitance between the valley FP-V and the sensing unit SU will be referred to as a second capacitance Cap2. The first capacitance Cap1 may be different from the second capacitance Cap2. The sensing unit SU may be configured to recognize the fingerprint FP using a difference between the first capacitance Cap1 and the second capacitance Cap2.

Figure 3:
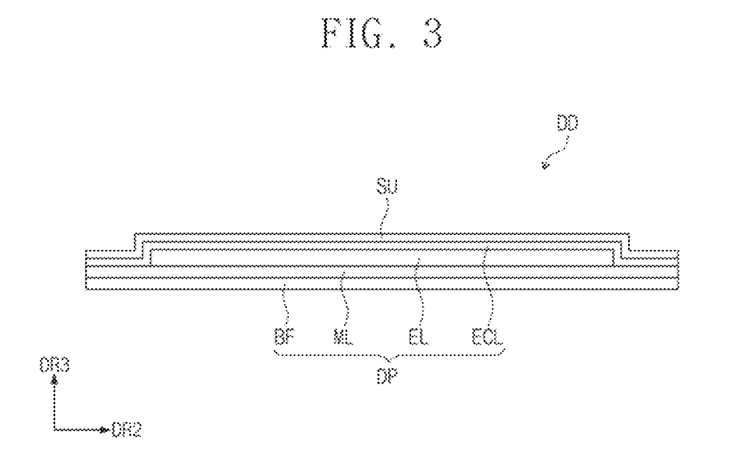
FIG. 3 is a schematic sectional view illustrating a display device according to some embodiments of the inventive concept.

FIG. 3 is a schematic sectional view illustrating a display device according to some embodiments of the inventive concept. In FIG. 3, the display panel DP and the sensing unit SU are illustrated.

The display panel DP may include a base film BF, a circuit layer ML, a luminescent device layer EL, and a thin encapsulation layer ECL.

The base film BF may be or include a plastic substrate, a glass substrate, a metal substrate, or a substrate made of an organic/inorganic composite material. The plastic substrate may include at least one of acrylic resins, methacryl resins, polyisoprene resins, vinyl resins, epoxy resins, urethane resins, cellulose resins, siloxane resins, polyimide resins, polyamide resins, or perylene resins.

The circuit layer ML may include a plurality of insulating layers, a plurality of conductive layers, and at least one semiconductor layer. The plurality of conductive layers in the circuit layer ML may constitute signal lines and/or a control circuit of a pixel.

The luminescent device layer EL may include a display element (e.g., organic light emitting diodes), and depending on the kind of the display panel DP, the luminescent device layer EL may be configured to include inorganic light-emitting diodes or organic-inorganic hybrid light-emitting diodes.

The thin encapsulation layer ECL may be configured to seal the luminescent device layer EL. The thin encapsulation layer ECL may include a plurality of inorganic layers and at least one organic layer interposed therebetween. The inorganic layers may protect the luminescent device layer EL from moisture and oxygen, and the organic layer may protect the luminescent device layer EL from foreign substances (e.g., dust particles).

In addition, the thin encapsulation layer ECL may further include a buffer layer. The buffer layer may be a layer most adjacent to the sensing unit SU. The buffer layer may be an inorganic layer or an organic layer. The inorganic layer may include at least one of silicon nitride, silicon oxynitride, silicon oxide, titanium oxide, or aluminum oxide. The organic layer may include polymers (e.g., acrylic organic materials). However, the inventive concept is not limited to these examples.

The sensing unit SU may be directly provided on the display panel DP. In the present specification, the expression "be directly provided" is used to represent that two layers are successively formed one on top of the other, without formation of an additional adhesive layer. However, the inventive concept is not limited thereto, and the display panel DP and the sensing unit SU may be coupled to each other by an adhesive member (not shown).

The adhesive member may be formed of or include an organic adhesive layer (e.g., an optically clear adhesive (OCA) film, an optically clear resin (OCR) film, or a pressure sensitive adhesive (PSA) film). The organic adhesive layer may include adhesive materials, such as polyurethanes, polyacrylic, polyester, polyepoxy, and polyvinyl acetate materials.

Figure 4:
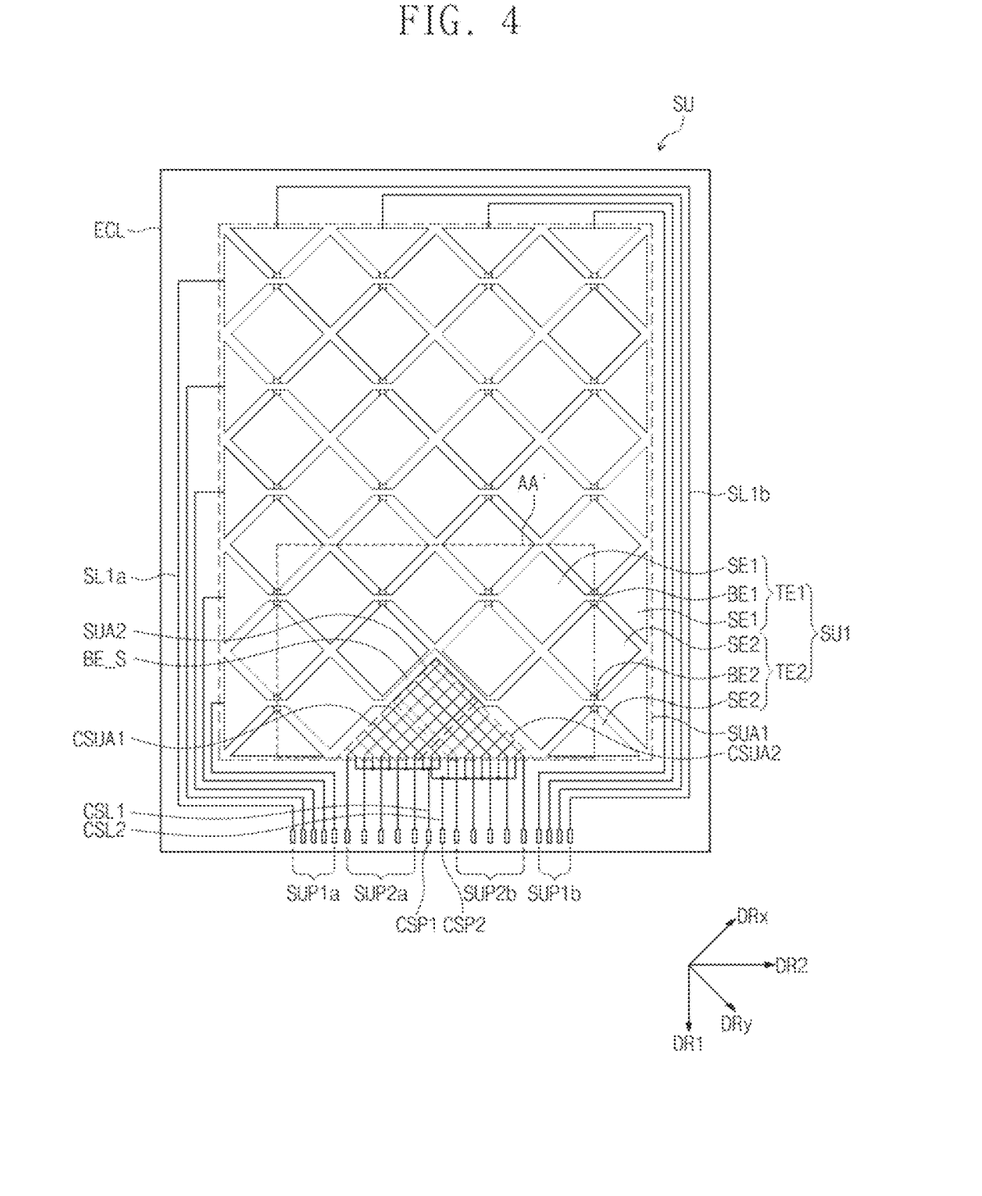
FIG. 4 is a plan view illustrating a sensing unit according to some embodiments of the inventive concept.
Figure 5A:
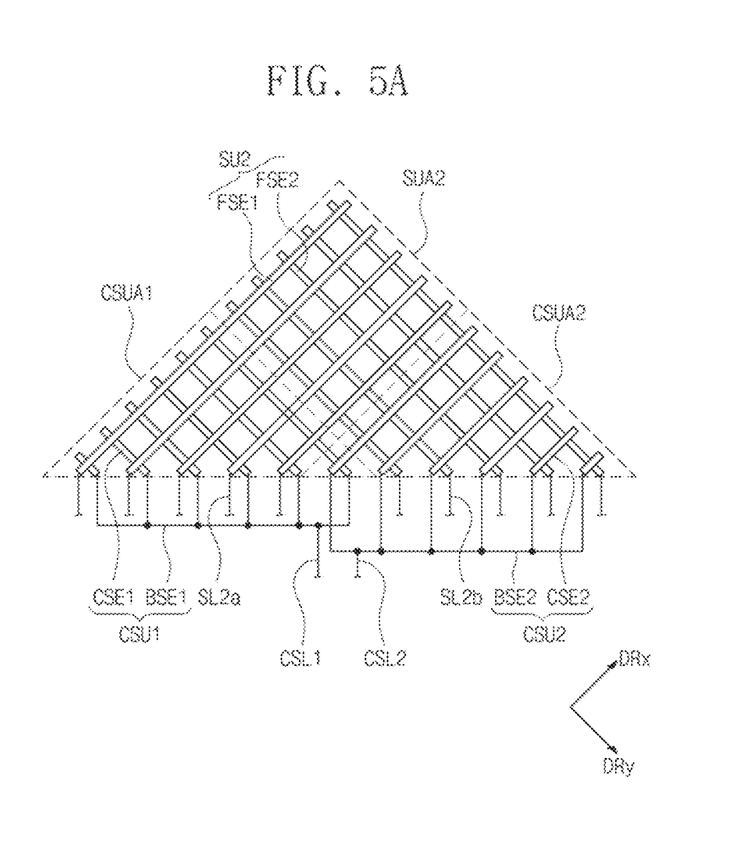
FIG. 5A is a plan view illustrating a second sensing part and a sensing compensation part according to some embodiments of the inventive concept.

FIG. 4 is a plan view illustrating a sensing unit according to some embodiments of the inventive concept, and FIG. 5A is a plan view illustrating a second sensing part and a sensing compensation part according to some embodiments of the inventive concept.

Referring to FIGS. 4 and 5A, the sensing unit SU may include a first sensing part SU1, a second sensing part SU2, and sensing compensation parts CSU1 and CSU2.

A touch sensing region SUA1, a fingerprint sensing region SUA2, and first and second compensation regions CSUA1 and CSUA2 may be defined in a base layer ECL. The base layer ECL may be used as a substrate, on which the first sensing part SU1, the second sensing part SU2, and the sensing compensation parts CSU1 and CSU2 are formed, and in the present embodiment, it may be the thin encapsulation layer ECL.

The first sensing part SU1 may be provided on the touch sensing region SUA1, the second sensing part SU2 may be provided on the fingerprint sensing region SUA2, and the sensing compensation parts CSU1 and CSU2 may be provided on the first and second compensation regions CSUA1 and CSUA2.

The first sensing part SU1 may be configured to sense a touch event, and the second sensing part SU2 may be configured to recognize a fingerprint. The sensing compensation parts CSU1 and CSU2 may be configured to produce signals, which will be used to compensate signals produced in the first sensing part SU1, based on signals produced in the second sensing part SU2. This will be described in more detail with reference to FIG. 7.

The first sensing part SU1 may include first sensing patterns TE1, second sensing patterns TE2, first lines SL1a, and second lines SL1b. The first sensing patterns TE1 may be arranged in the first direction DR1, and each of the first sensing patterns TE1 may extend in the second direction DR2 crossing the first direction DR1. The second sensing patterns TE2 may be arranged in the second direction DR2, and each of the second sensing patterns TE2 may extend in the first direction DR1.

Each of the first sensing patterns TE1 may include a plurality of first sensing electrodes SE1 and a plurality of first connection electrodes BE1, each of which is used to connect adjacent ones of the first sensing electrodes SE1 to each other. Each of the second sensing patterns TE2 may include a plurality of second sensing electrodes SE2 and a plurality of second connection electrodes BE2, each of which is used to connect adjacent ones of the second sensing electrodes SE2 to each other.

In some embodiments, the plurality of first sensing electrodes SE1, the plurality of first connection electrodes BE1, and the plurality of second sensing electrodes SE2 may be placed on the same layer, and the plurality of second connection electrodes BE2 may be placed on a different layer therefrom. For example, the plurality of first connection electrodes BE1 and the plurality of second connection electrodes BE2 may be spaced apart from each other with an insulating layer or an insulating pattern interposed therebetween and moreover may cross each other in an electrically disconnected manner.

The first and second sensing electrodes SE1 and SE2 may be formed of or include at least one of transparent conductive oxide materials. For example, the first and second sensing electrodes SE1 and SE2 may include at least one of indium zinc oxide (IZO), indium tin oxide (ITO), indium gallium oxide (IGO), indium zinc gallium oxide (IGZO), and mixtures or compounds thereof. However, the inventive concept is not limited thereto. For example, the first and second sensing electrodes SE1 and SE2 may be provided to have a metal mesh structure.

The first lines SL1a may be connected to the first sensing patterns TE1, respectively, and the second lines SL1b may be connected to the second sensing patterns TE2, respectively. First touch pad parts SUP1a may be electrically connected to the first lines SL1a, and second touch pad parts SUP1b may be electrically connected to the second lines SL1b. The first touch pad parts SUP1a and the second touch pad parts SUP1b may be configured to transmit electrical signals from an external driving circuit (not shown) to the first lines SL1a and/or the second lines SL1b or to transmit external touch sensing signals, which are obtained by the touch sensing region SUA1, to the driving circuit.

The second sensing part SU2 may include a plurality of first electrodes FSE1 and a plurality of second electrodes FSE2. Each of the first electrodes FSE1 may extend in a specific direction (e.g., a fourth direction DRx). The first electrodes FSE1 may be arranged in a fifth direction DRy crossing the fourth direction DRx. The second electrodes FSE2 may extend in the fifth direction DRy and may be arranged in the fourth direction DRx.

The first electrodes FSE1 may extend from the fingerprint sensing region SUA2 to the first compensation region CSUA1. For example, the first electrodes FSE1 may be provided on the fingerprint sensing region SUA2 and the first compensation region CSUA1. Similarly, the second electrodes FSE2 may extend from the fingerprint sensing region SUA2 to the second compensation region CSUA2. For example, the second electrodes FSE2 may be provided on the fingerprint sensing region SUA2 and the second compensation region CSUA2.

The first electrodes FSE1 and the second electrodes FSE2 may be provided on layers that are different from each other. For example, an insulating layer (not shown) may be provided between the first electrodes FSE1 and the second electrodes FSE2.

The second electrodes FSE2 and the second connection electrodes BE2 may be provided on the same layer. For example, all of the second electrodes FSE2 and the second connection electrodes BE2 may be provided on the base layer ECL. In addition, the first electrodes FSE1 may be provided on the same layer as a layer, on which the first sensing electrodes SE1, the first connection electrodes BE1, and the second sensing electrodes SE2 are provided. For example, the first electrodes FSE1, the first sensing electrodes SE1, the first connection electrodes BE1, and the second sensing electrodes SE2 may be provided on the insulating layer. Thus, it may be possible to realize the first sensing part SU1 for sensing a touch event and the second sensing part SU2 for recognizing a fingerprint on the same layer, and this may make it possible to reduce a thickness of the display device DD (e.g., see FIG. 1).

A plurality of first lines SL2a may be connected to the first electrodes FSE1, and a plurality of second lines SL2b may be connected to the second electrodes FSE2.

A first fingerprint pad parts SUP2a may be connected to the first lines SL2a, and a second fingerprint pad parts SUP2b may be connected to the second lines SL2b. The driving circuit (not shown), which is connected to the first fingerprint pad parts SUP2a and the second fingerprint pad parts SUP2b, may be configured to provide driving signals to the first electrodes FSE1 and to grasp the presence or absence of a touch event, coordinates of a touch event, or a fingerprint pattern, using an amount of change in capacitance or voltage measured by the second electrodes FSE2.

The sensing compensation parts CSU1 and CSU2 may include a first compensation electrode part CSU1 and a second compensation electrode part CSU2. The first compensation electrode part CSU1 may be provided to cross the first electrodes FSE1, and the second compensation electrode part CSU2 may be provided to cross the second electrodes FSE2. The first compensation electrode part CSU1 may include a plurality of first compensation electrodes CSE1 and a first compensation connection line BSE1, and the second compensation electrode part CSU2 may include a plurality of second compensation electrodes CSE2 and a second compensation connection line BSE2.

The first compensation electrodes CSE1 may extend in the fifth direction DRy and may be arranged in the fourth direction DRx. The second compensation electrodes CSE2 may extend in the fourth direction DRx and may be arranged in the fifth direction DRy.

The first compensation electrodes CSE1 and the second electrodes FSE2 may be provided on the same layer. Thus, the first compensation electrodes CSE1 and the second electrodes FSE2 may be formed concurrently (e.g. substantially simultaneously) by the same process. Furthermore, the second compensation electrodes CSE2 and the first electrodes FSE1 may be provided on the same layer, and thus, the second compensation electrodes CSE2 and the first electrodes FSE1 may be formed concurrently (e.g. substantially simultaneously) by the same process.

The first compensation electrodes CSE1 and the second electrodes FSE2 may be bar-shaped patterns having substantially the same width, and the second compensation electrodes CSE2 and the first electrodes FSE1 may also be bar-shaped patterns having substantially the same width.

The first compensation connection line BSE1 may be provided to connect the first compensation electrodes CSE1, which are spaced apart from each other, to each other. The second compensation connection line BSE2 may be provided to connect the second compensation electrodes CSE2, which are spaced apart from each other, to each other. The first compensation connection line BSE1 may be connected to a first line CSL1, and the second compensation connection line BSE2 may be connected to a second line CSL2. The first compensation connection line BSE1 and the first line CSL1 may be formed concurrently (e.g. substantially simultaneously) by the same process, and the second compensation connection line BSE2 and the second line CSL2 may be formed concurrently (e.g. substantially simultaneously) by the same process.

The first line CSL1 may be electrically connected to a first compensation pad part CSP1, and the second line CSL2 may be electrically connected to a second compensation pad part CSP2.

A sensing region including the fingerprint sensing region SUA2, the first compensation region CSUA1, and the second compensation region CSUA2 may have a triangular shape. One side of the sensing region disposed on the boundary between the display region DD-DA (e.g., see FIG. 1) and the non-display region DD-NDA (e.g., see FIG. 1). Therefore, lines connected to the electrodes disposed in the sensing region may not extend to the inside of the region DD-DA (e.g., see FIG. 1). Thus, the first and second lines SL2a and SL2b and the first and second lines CSL1 and CSL2 may not be provided on a region overlapped with the display region DD-DA (e.g., see FIG. 1). Accordingly, the first and second lines SL2a, SL2b and the first and second lines CSL1 and CSL2 may not be recognized by a user.

The fingerprint sensing region SUA2 may have a rhombus shape (e.g. a lozenge or diamond shape), and each of the first compensation region CSUA1 and the second compensation region CSUA2 may have a triangular shape. The first compensation region CSUA1 may be located adjacent to a side of the fingerprint sensing region SUA2, and the second compensation region CSUA2 may be located adjacent to another side of the fingerprint sensing region SUA2.

In some embodiments, some of the sensing electrodes may be separated to each other by the fingerprint sensing region SUA2 and the first and second compensation regions CSUA1 and CSUA2, and such sensing electrodes may be connected to each other by a connection electrode BE_S extending along an edge of the fingerprint sensing region SUA2.

Figure 5B:
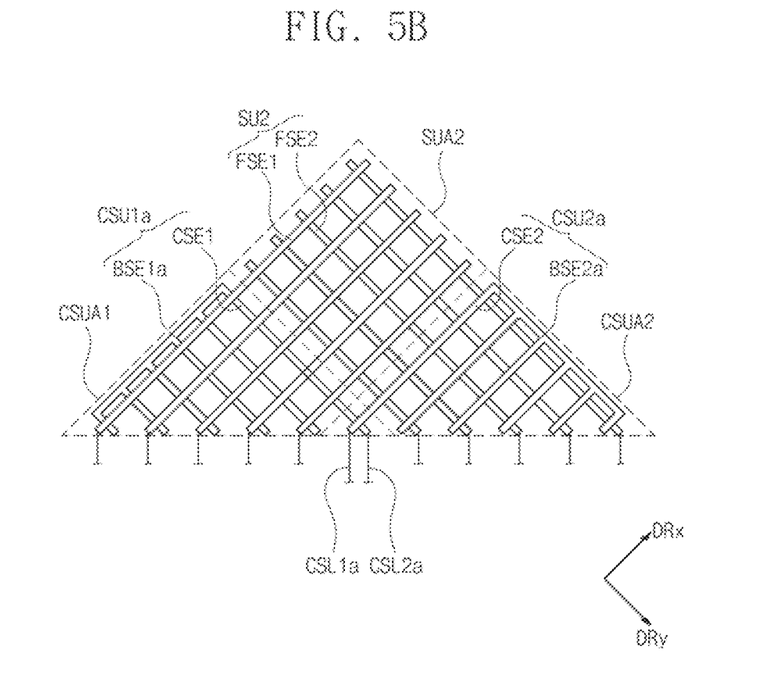
FIG. 5B is a plan view illustrating a second sensing part and a sensing compensation part according to some embodiments of the inventive concept.

FIG. 5B is a plan view illustrating a second sensing part and a sensing compensation part according to some embodiments of the inventive concept. For concise description, an element previously described with reference to FIGS. 4 and 5A will be identified by the same reference number without repeating an overlapping description thereof.

Referring to FIG. 5B, the first compensation electrode part CSU1a, the second compensation electrode part CSU2a, and the second sensing part SU2 are illustrated.

The first compensation electrode part CSU1a may include a plurality of first compensation electrodes CSE1 and a first compensation connection electrode BSE1a, and the second compensation electrode part CSU2a may include a plurality of second compensation electrodes CSE2 and a second compensation connection electrode BSE2a.

In some embodiments, the first compensation electrodes CSE1 and the first compensation connection electrode BSE1a may be formed by the same process, and the second compensation electrodes CSE2 and the second compensation connection electrode BSE2a may be formed by the same process.

In some embodiments, the first compensation electrodes CSE1 and the second compensation connection electrode BSE2a may be formed by the same process, and the second compensation electrodes CSE2 and the first compensation connection electrode BSE1a may be formed by the same process. In this case, the first compensation electrodes CSE1 and the first compensation connection electrode BSE1a may be provided on different layers, and the second compensation electrodes CSE2 and the second compensation connection electrode BSE2a may be provided on different layers. Thus, the first compensation electrodes CSE1 and the first compensation connection electrode BSE1a may be connected to each other via conductive patterns penetrating an insulating layer therebetween, and the second compensation electrodes CSE2 and the second compensation connection electrode BSE2a may be connected to each other via conductive patterns penetrating an insulating layer therebetween.

A first line CSL2a may be electrically connected to the first compensation electrodes CSE1, and a second line CSL1a may be electrically connected to the second compensation electrodes CSE2.

Figure 6:
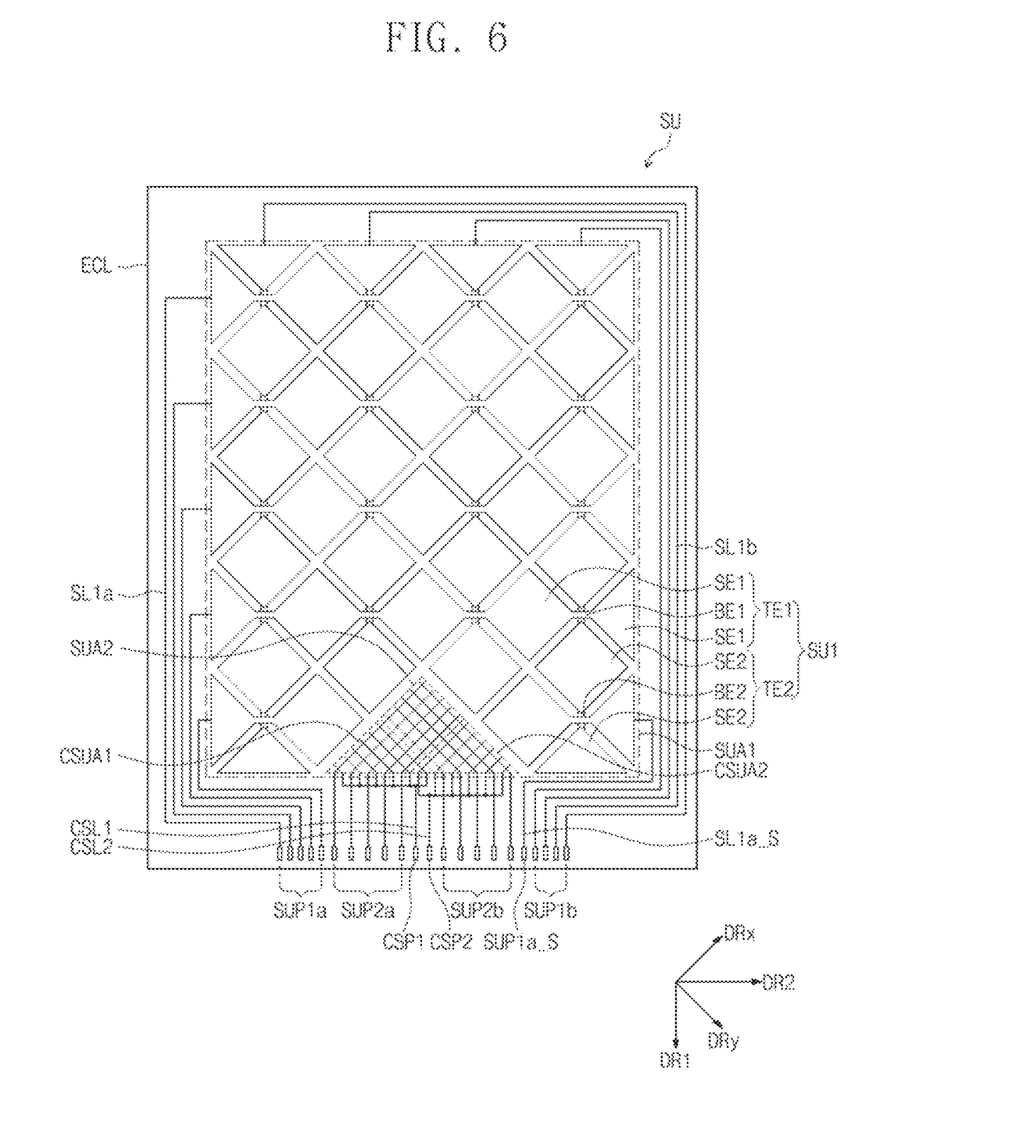
FIG. 6 is a plan view illustrating a sensing unit according to some embodiments of the inventive concept.

FIG. 6 is a plan view illustrating a sensing unit according to some embodiments of the inventive concept. For concise description, an element previously described with reference to FIG. 4 will be identified by the same reference number without repeating an overlapping description thereof.

Referring to FIG. 6, a sub line SL1a_S may be further provided to connect some of the sensing electrodes, which are separated each other by the fingerprint sensing region SUA2 and the first and second compensation regions CSUA1 and CSUA2. The sub line SL1a_S may be connected to a first sub touch pad part SUP1a_S, which is used to receive the same signal as that of the first touch pad part SUP1a.

Figure 7:
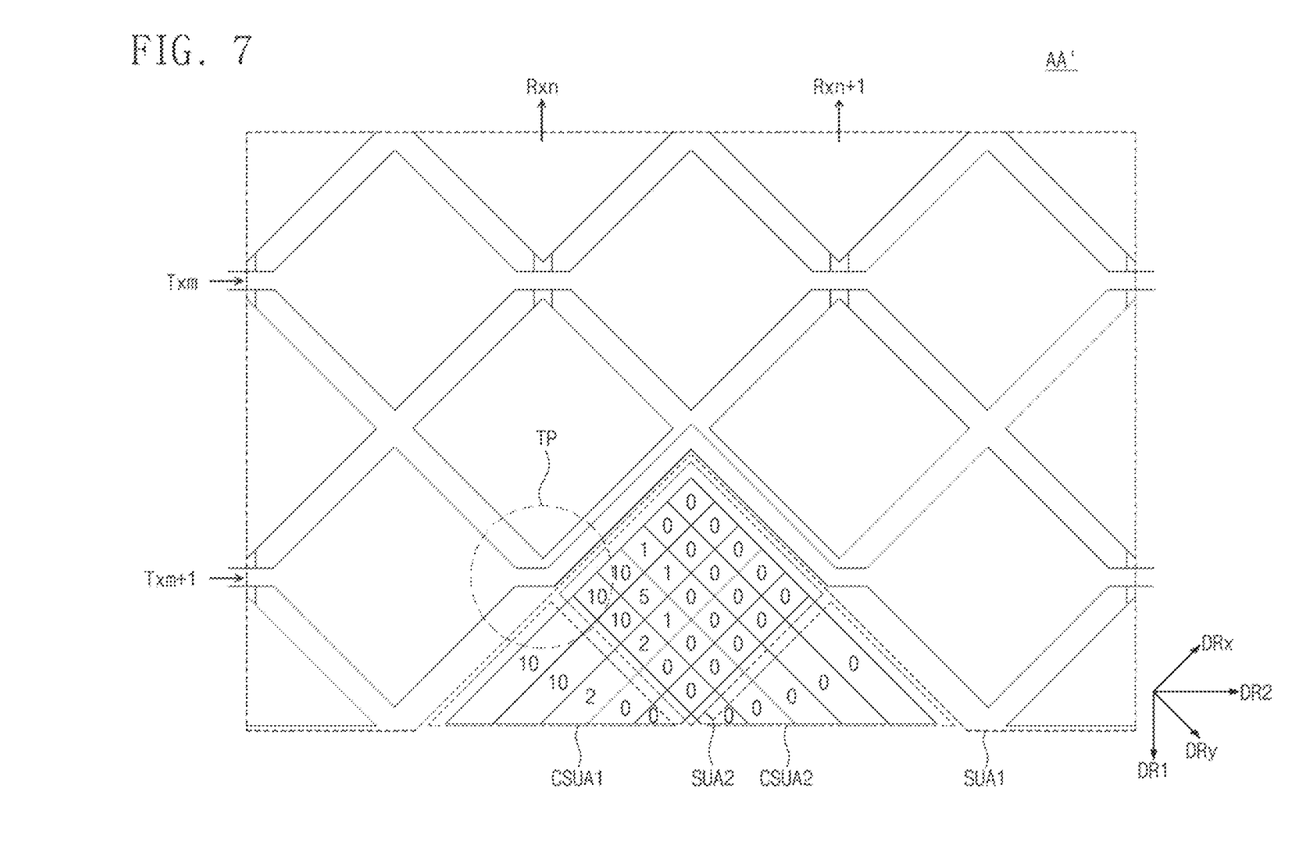
FIG. 7 is an enlarged plan view of a portion AA' of FIG. 4.

FIG. 7 is an enlarged plan view of a portion AA' of FIG. 4.

FIG. 7 illustrates measurement results, which are obtained by the fingerprint sensing region SUA2 and the first and second compensation regions CSUA1 and CSUA2 when there is a touch event. For example, each of the numbers shown in FIG. 7 may be an amount of change in capacitance measured when the touch event occurs at a touch position TP of FIG. 7.

Hereinafter, a method of determining the presence or absence of a touch event, coordinates of a touch event, or a fingerprint pattern, based on an amount of change in capacitance measured by the second electrodes FSE2 when driving signals are applied to the first electrodes FSE1, will be described with reference to FIGS. 4, 5A, and 7. However, the inventive concept is not limited thereto, and for example, the method may be performed to measure a change in capacitance using the first electrodes FSE1, while applying the driving signals to the second electrodes FSE2.

When the driving signal is applied to the first one of the first electrodes, an amount of change in capacitance may be measured by the first compensation electrode part CSU1. For example, such an amount of change in capacitance may be 10. When the driving signal is applied to the second one of the first electrodes, an amount of change in capacitance measured by the first compensation electrode part CSU1 may be 10. When the driving signal is applied to the third one of the first electrodes, an amount of change in capacitance measured by the first compensation electrode part CSU1 may be 2. When the driving signal is applied to the fourth and fifth ones of the first electrodes, an amount of change in capacitance measured by the first compensation electrode part CSU1 may be 0. That is, in the first compensation region CSUA1, an amount of change in capacitance may be detected using the driving signal provided to the second sensing part SU2.

When the driving signal is input to the second compensation electrode part CSU2, the capacitance change amounts measured by the first to fifth ones of the second electrodes FSE2 may be 0.

When the driving signal is input to the first one of the first electrodes, an amount of change in capacitance measured by the first one of the second electrodes may be 0, an amount of change in capacitance measured by the second one of the second electrodes may be 0, an amount of change in capacitance measured by the third one of the second electrodes may be 1, an amount of change in capacitance measured by the fourth one of the second electrodes may be 10, an amount of change in capacitance measured by the fifth one of the second electrodes may be 10.

The first one of the first electrodes may be the longest first electrode of the first electrodes FSE1, and the first one of the second electrodes may be the longest second electrode of the second electrodes FSE2.

The driving signals may be sequentially provided to the first sensing patterns TE1. For example, the m-th driving signal Txm may be provided to the m-th first sensing pattern, and the (m+1)-th driving signal Txm+1 may be provided to the (m+1)-th first sensing pattern. Furthermore, whenever each driving signal is provided, the second sensing patterns TE2 may measure an amount of change in capacitance. The n-th sensing signal Rxn may be received through the n-th second sensing pattern, and the (n+1)-th sensing signal Rxn+1 may be received through the (n+1)-th second sensing pattern. However, the inventive concept is not limited thereto, and in certain embodiments, the driving signals may be sequentially provided to the second sensing patterns TE2, and the first sensing patterns TE1 may be used to measure capacitance change amounts.

Referring to FIG. 7, the sensing patterns TE1 and TE2 may not be provided in a certain region (e.g., the fingerprint sensing region SUA2 and the first and second compensation regions CSUA1 and CSUA2). Thus, an amount of change in capacitance measured may be relatively small in a region adjacent to the fingerprint sensing region SUA2 and the first and second compensation regions CSUA1 and CSUA2.

According to some embodiments of the inventive concept, a touch sensing signal may be compensated using a change amount obtained in the fingerprint sensing region SUA2 and the first and second compensation regions CSUA1 and CSUA2.

For example, all of capacitance change amounts obtained in the fingerprint sensing region SUA2 may be summed up. The sum of capacitance change amounts obtained in the fingerprint sensing region SUA2 may be 40 (i.e., 10+10+1+10+5+1+2+1), and the sum of capacitance change amounts obtained in the first compensation region CSUA1 may be 22 (i.e., 10+10+2), and the sum of capacitance change amounts obtained in the second compensation region CSUA2 may be 0.

The sum of capacitance change amounts obtained in each of the fingerprint sensing region SUA2, the first compensation region CSUA1, and the second compensation region CSUA2 may be used to compensate a touch sensing signal. For example, the compensation may be performed to multiply each of the sums of the capacitance change amounts by a weight factor and then to add it to the value of the n-th sensing signal Rxn, when the (m+1)-th driving signal Txm+1 is provided.

Figure 8:
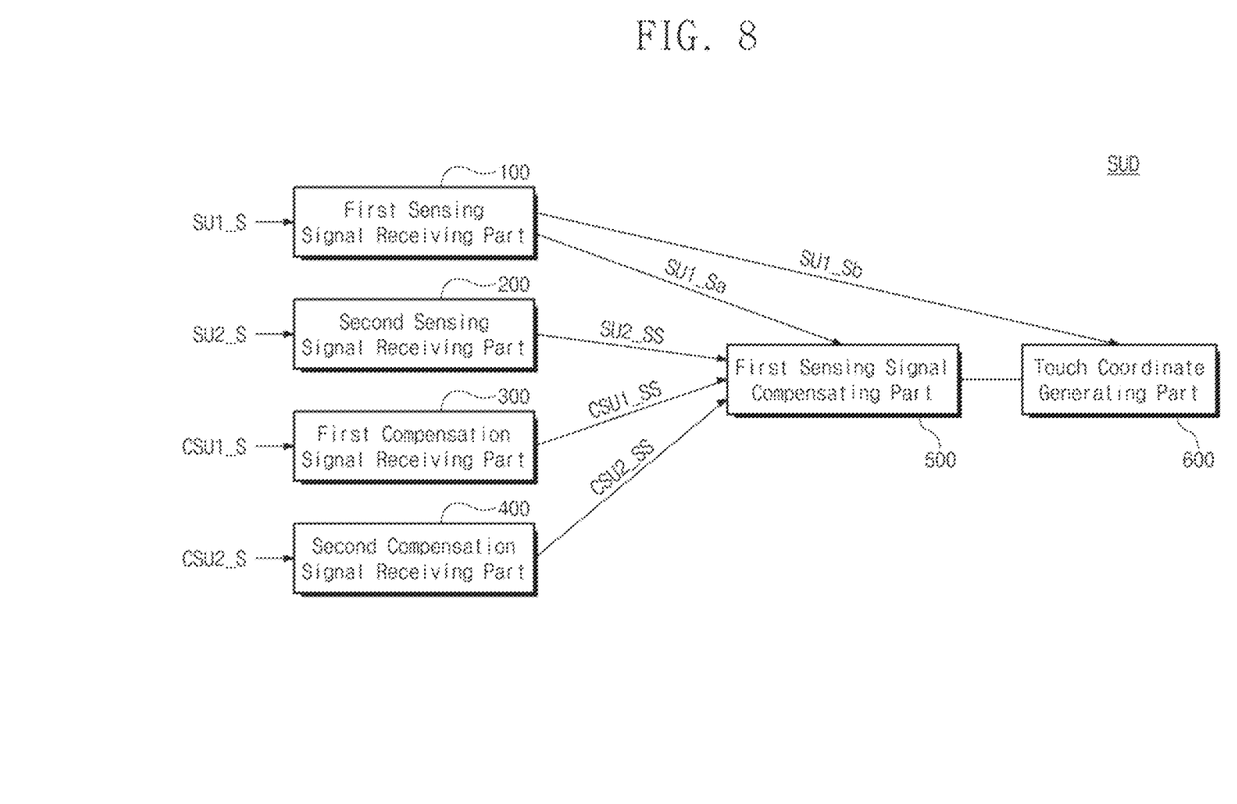
FIG. 8 is a block diagram illustrating a driving circuit according to some embodiments of the inventive concept.

FIG. 8 is a block diagram illustrating a driving circuit according to some embodiments of the inventive concept.

Referring to FIGS. 4, 5A, and 8, a driving circuit SUD may be electrically connected to the pad parts SUP1a, SUP1b, SUP2a, SUP2b, CSP1, and CSP2 shown in FIG. 4. The driving circuit SUD may be provided in the form of a single integrated circuit, but the inventive concept is not limited thereto.

The driving circuit SUD may include a first sensing signal receiving part 100, a second sensing signal receiving part 200, a first compensation signal receiving part 300, a second compensation signal receiving part 400, a first sensing signal compensating part 500, and a touch coordinate generating part 600.

The first sensing signal receiving part 100 may receive a first sensing signal SU1_S through the touch pad parts SUP1a and SUP1b. The second sensing signal receiving part 200 may receive a second sensing signal SU2_S through the fingerprint pad parts SUP2a and SUP2b. The first compensation signal receiving part 300 may receive a first compensation signal CSU1_S through the first compensation pad part CSP1. The second compensation signal receiving part 400 may receive a second compensation signal CSU2_S through the second compensation pad part CSP2.

The second sensing signal receiving part 200 may be configured to obtain capacitance change amounts from the received second sensing signal SU2_S and then to output a second summed sensing signal SU2_SS obtained by summing the capacitance change amounts. The first compensation signal receiving part 300 may be configured to obtain capacitance change amounts from the received first compensation signal CSU1_S and then to output a first summed compensation signal CSU1_SS obtained by summing the capacitance change amounts. The second compensation signal receiving part 400 may be configured to obtain capacitance change amounts from the received second compensation signal CSU2_S and then to output a second summed compensation signal CSU2_SS obtained by summing the capacitance change amounts.

The first sensing signal SU1_S may include the first sensing signal SU1_Sa, to which a compensation process should be performed, and a first sensing signal SU1_Sb which does not require the compensation process. The first sensing signal receiving part 100 may be configured to output the first sensing signal SU1_Sa to the first sensing signal compensating part 500 and to output the first sensing signal SU1_Sb to the touch coordinate generating part 600, but the inventive concept is not limited thereto. For example, the first sensing signal receiving part 100 may be configured to output all of the first sensing signal SU1_S to the first sensing signal compensating part 500. In certain embodiments, the first sensing signal receiving part 100 and the first sensing signal compensating part 500 may be provided in the form of a single component.

In the first sensing signal compensating part 500, the first sensing signal SU1_Sa may be compensated by multiplying each of the second summed sensing signal SU2_SS, the first summed compensation signal CSU1_SS, and the second summed compensation signal CSU2_SS by a weight factor. The touch coordinate generating part 600 may be configured to produce coordinates of the touch event, based on the compensated first sensing signal. This may make it possible to obtain touch data with improved reliability.

In a sensing unit according to some embodiments of the inventive concept, a first sensing part for sensing a touch event and a second sensing part of sensing a fingerprint may be provided on the same layer, and thus, it may be possible to reduce a thickness of a display device including the sensing unit. In addition, the second sensing part and a sensing compensation part, which is provided between the first and second sensing parts, may be used to compensate signals of the first sensing part. Thus, it may be possible to obtain touch data with improved reliability.

While example embodiments of the inventive concepts have been particularly shown and described, it will be understood by one of ordinary skill in the art that variations in form and detail may be made therein without departing from the spirit and scope of the attached claims, and the equivalent.

What is claimed is:

1. A sensing unit, comprising:
   a first sensing part comprising a plurality of sensing electrodes and a plurality of connection electrodes connecting the plurality of sensing electrodes;
   a second sensing part comprising a plurality of first electrodes and a plurality of second electrodes crossing the plurality of first electrodes; and
   a sensing compensation part comprising a first compensation electrode part crossing the plurality of first electrodes and a second compensation electrode part crossing the plurality of second electrodes,
   wherein the first compensation electrode part further comprises a first compensation connection line connecting electrodes of the first compensation electrode part to each other, and
   the second compensation electrode part further comprises a second compensation connection line connecting electrodes of the second compensation electrode part to each other.

2. The sensing unit of claim 1, wherein the plurality of first electrodes extend in a first direction and are arranged along a second direction crossing the first direction, and
   the plurality of second electrodes extend in the second direction and are arranged along the first direction.

3. The sensing unit of claim 2, wherein the first compensation electrode part comprises a plurality of first compensation electrodes, and wherein the plurality of first compensation electrodes extend in the second direction, are arranged in the first direction, and are electrically connected to each other.

4. The sensing unit of claim 2, wherein the second compensation electrode part comprises a plurality of second compensation electrodes, and wherein the plurality of second compensation electrodes extend in the first direction, are arranged in the second direction, and are electrically connected to each other.

5. The sensing unit of claim 1, wherein the plurality of first electrodes and the plurality of second electrodes are on different layers from each other and are electrically disconnected from each other.

6. The sensing unit of claim 5, wherein the plurality of first electrodes and the second compensation electrode part are on a first same layer, and the plurality of second electrodes and the first compensation electrode part are on a second same layer.

7. The sensing unit of claim 1, wherein the second sensing part and the sensing compensation part are in a sensing region that has a triangular shape.

8. The sensing unit of claim 7, wherein the sensing region comprises:
   a fingerprint sensing region, in which the plurality of first electrodes and the plurality of second electrodes cross each other;
   a first compensation region, in which the plurality of first electrodes and the first compensation electrode part cross each other; and
   a second compensation region, in which the plurality of second electrodes and the second compensation electrode part cross each other.

9. The sensing unit of claim 8, wherein the fingerprint sensing region has a lozenge shape, and
   each of the first compensation region and the second compensation region has a triangular shape.

10. The sensing unit of claim 8, further comprising a sensing driver, which is configured to receive a first sensing signal from the first sensing part, a second sensing signal from the second sensing part, a first compensation signal from the first compensation region, and a second compensation signal from the second compensation region.

11. The sensing unit of claim 10, wherein the sensing driver is configured to compensate the first sensing signal using the second sensing signal, the first compensation signal, and the second compensation signal.

12. A sensing unit comprising:
    a base layer, comprising a touch sensing region, a fingerprint sensing region, and first and second compensation regions;
    a plurality of first electrodes on the fingerprint sensing region and the first compensation region, the plurality of first electrodes extending in a first direction;
    a plurality of second electrodes on the fingerprint sensing region and the second compensation region, the plurality of second electrodes extending in a second direction crossing the first direction;
    a first compensation electrode part on the first compensation region and crossing the plurality of first electrodes; and
    a second compensation electrode part on the second compensation region and crossing the plurality of second electrodes,
    wherein the first compensation electrode part further comprises a first compensation connection line connecting electrodes of the first compensation electrode part to each other, and
    the second compensation electrode part further comprises a second compensation connection line connecting electrodes of the second compensation electrode part to each other.

13. The sensing unit of claim 12, wherein the first compensation electrode part comprises a plurality of first compensation electrodes, and wherein the plurality of first compensation electrodes extend in the second direction, are arranged in the first direction, and are electrically connected to each other.

14. The sensing unit of claim 12, wherein the second compensation electrode part comprises a plurality of second compensation electrodes, and wherein the plurality of second compensation electrodes extend in the first direction, are arranged in the second direction, and are electrically connected to each other.

15. The sensing unit of claim 12, wherein the plurality of first electrodes and the plurality of second electrodes are on different layers from each other and are electrically disconnected from each other,
    the plurality of first electrodes and the second compensation electrode part are on a first same layer, and
    the plurality of second electrodes and the first compensation electrode part are on a second same layer.

16. A display device comprising:
    a display unit configured to display an image; and
    a sensing unit on the display unit, the sensing unit comprising a first sensing part configured to sense a touch event, a second sensing part configured to recognize a fingerprint, and a sensing compensation part configured to produce a compensation signal for compensating a first sensing signal of the first sensing part, using a second sensing signal of the second sensing part, wherein the second sensing part comprises a plurality of first electrodes and a plurality of second electrodes crossing the plurality of first electrodes, and the sensing compensation part comprises a first compensation electrode part crossing the plurality of first electrodes and a second compensation electrode part crossing the plurality of second electrodes, and wherein the first compensation electrode part further comprises a first compensation connection line connecting electrodes of the first compensation electrode part to each other, and the second compensation electrode part further comprises a second compensation connection line connecting electrodes of the second compensation electrode part to each other.

17. The display device of claim 16, wherein the plurality of first electrodes extend in a first direction and are arranged in a second direction crossing the first direction, the second compensation electrode part comprises a plurality of second compensation electrodes, which extend in the first direction and are arranged in the second direction, and the plurality of first electrodes and the plurality of second compensation electrodes are on a same layer.

18. The display device of claim 17, wherein the plurality of second electrodes extend in the second direction and are arranged in the first direction, the first compensation electrode part comprises a plurality of first compensation electrodes, which extend in the second direction and are arranged in the first direction, and the plurality of second electrodes and the plurality of first compensation electrodes are on a same layer.

19. The display device of claim 18, wherein the first compensation connection line connects the first compensation electrodes to each other, and the second compensation connection line connects the second compensation electrodes to each other.

* * * * *